United States Patent
Lee et al.

(10) Patent No.: US 10,008,351 B2
(45) Date of Patent: Jun. 26, 2018

(54) CONTROL SYSTEM FOR A WIRELESS POWER SWITCH WITHOUT A NEUTRAL WIRE

(71) Applicant: Climax Technology Co., LTD., Taipei (TW)

(72) Inventors: Pin-Chia Lee, Taipei (TW); Lung-Shu Liu, Taipei (TW); Yu-Ling Chou, Taipei (TW)

(73) Assignee: Climax Technology Co., Ltd., Taipei (TW)

( * ) Notice: Subject to any disclaimer, the term of this patent is extended or adjusted under 35 U.S.C. 154(b) by 420 days.

(21) Appl. No.: 14/811,014

(22) Filed: Jul. 28, 2015

(65) Prior Publication Data
US 2016/0379782 A1 Dec. 29, 2016

(30) Foreign Application Priority Data

Jun. 23, 2015 (TW) .............................. 104120140 A

(51) Int. Cl.
| | |
|---|---|
| *H01H 47/00* | (2006.01) |
| *H02J 4/00* | (2006.01) |
| *H02J 7/00* | (2006.01) |
| *H02J 13/00* | (2006.01) |
| *H02M 7/04* | (2006.01) |

(52) U.S. Cl.
CPC ............... *H01H 47/00* (2013.01); *H02J 4/00* (2013.01); *H02J 7/0052* (2013.01); *H02J 13/00* (2013.01); *H02M 7/04* (2013.01)

(58) Field of Classification Search
CPC ............................... H01H 47/00; H02J 7/0052
See application file for complete search history.

(56) References Cited

U.S. PATENT DOCUMENTS

| | | | |
|---|---|---|---|
| 5,811,963 A | 9/1998 | Elwell | |
| 9,497,828 B2 * | 11/2016 | Shet ................. | H02M 3/33523 |
| 2002/0067138 A1 | 6/2002 | Birrell | |

(Continued)

FOREIGN PATENT DOCUMENTS

| | | |
|---|---|---|
| EP | 1220436 A2 | 7/2002 |
| WO | WO2014/110625 A1 | 7/2014 |

OTHER PUBLICATIONS

Extended European Search Report dated Sep. 23, 2016 in related European Patent Application No. 15179319.

*Primary Examiner* — Jeffrey Shin
(74) *Attorney, Agent, or Firm* — Donald E. Stout; Stout, Uxa & Buyan, LLP

(57) ABSTRACT

A control system for a wireless power switch without a NEUTRAL wire comprises a wireless controlled power switch with both terminals connected between a LINE wire and a switch wire of a switch box without the NEUTRAL wire; a power acquiring device having two power input terminals respectively connected to the LINE wire and the switch wire of the switch box; and a wireless automation control device receiving an output voltage of the power acquiring device as the required power, the wireless automation control device controlling open or close of the wireless controlled power switch according to wireless control signal wirelessly. Specifically, a load device is connected between the switch wire and the NEUTRAL wire, and impedance between the two power input terminals of the power acquiring device is substantially larger than impedance of the load device.

11 Claims, 3 Drawing Sheets

(56) References Cited

U.S. PATENT DOCUMENTS

2012/0063186 A1* 3/2012 Tsui .................. H02M 5/2576
363/126
2015/0054338 A1* 2/2015 Mohammed
Suhura ................ H02J 9/061
307/23

\* cited by examiner

CONTROL SYSTEM FOR A WIRELESS POWER SWITCH WITHOUT A NEUTRAL WIRE

CROSS-REFERENCE TO RELATED APPLICATIONS

The entire contents of Taiwan Patent Application No. 104120140, filed on Jun. 23, 2015, from which this application claims priority, are expressly incorporated herein by reference.

BACKGROUND OF THE INVENTION

1. Field of the Invention

The present invention generally relates to a control system for a wireless power switch, and more particularly to a control system for a wireless power switch without a NEUTRAL wire.

2. Description of Related Art

Wireless network has been commonly used for control of home automation due to low power consumption and low cost. A wireless power switch is ordinarily adopted in a wireless automation control system. Both terminals of the wireless power switch are normally connected to a LINE wire and a NEUTRAL wire of mains electricity, respectively. Alternating-current (AC) power supply is converted to direct-current (DC) power supply, which is then provided to a wireless controlled module of the wireless automation control system.

Switch boxes 11 in some places, however, comprise a LINE wire and a switch wire, but no NEUTRAL wire, as shown in FIG. 1A. A conventional wireless automation control system as shown in FIG. 1B, therefore, needs to pull the NEUTRAL wire additionally for a power device 12. The power device 12 provides power for an automation control device 13, which controls a power switch S wirelessly. Nevertheless, architecture of FIG. 1B is implemented with increasing complexity and cost for lack of the NEUTRAL wire in the switch box 11. In another wireless automation control system, a battery is used as a power supply, however, it causes inconvenience during battery replacement.

For the reason that the switch box of the conventional wireless automation control system comprises no NEUTRAL wire that causes system complexity or inconvenience, a need has thus arisen to propose a novel mechanism to overcome drawbacks of the conventional wireless automation control system.

SUMMARY OF THE INVENTION

In view of the foregoing, it is an object of the embodiment of the present invention to provide a control system for a wireless power switch without presence of a NEUTRAL wire. The embodiment uses a LINE wire and a switch wire provided by a switch box as power source merely without the NEUTRAL wire. The control system could acquire current and power to power the control system itself while the power switch is open and the load device is effectively not activated. According to one embodiment, a direct-current voltage is generated to charge a battery when the power switch is open; and the battery provides storage power to the control system in turn when the power switch is closed and the power acquiring mechanism from mains is not available for the control system itself.

According to one embodiment, a control system for a wireless power switch without a NEUTRAL wire comprises a wireless controlled power switch, a power acquiring device and a wireless automation control device. Both terminals of the wireless controlled power switch are connected between a LINE wire and a switch wire of a switch box. Two power input terminals of the power acquiring device are respectively connected to the LINE wire and the switch wire of the switch box, in other words, the power input terminals of the power acquiring device and the wireless controlled power switch stated above are parallel connected. The power output port of the power acquiring device provides power for the wireless automation control device. The wireless automation control device takes the power of the power acquiring device as power source, and controls the open and close status of the wireless controlled power switch according to wireless control signal. A load device is connected between the switch wire and the NEUTRAL wire that is presented external the switch box, and the load device is connected with the parallel connected wireless controlled power switch and the power acquiring device together in series. The impedance between the power input terminals of the power acquiring device is substantially larger than the impedance of the load device. When the wireless controlled power switch is open, the load device is connected with the power acquiring device alone, and the mains voltage, i.e. the voltage between LINE and NEUTRAL, is applied on the series connected load device and power acquiring device, so that the voltage on load device is comparatively negligible small with respect to the voltage on power acquiring device due to the impedance of the load device is comparatively smaller than the impedance of the power acquiring device.

DETAILED DESCRIPTION OF THE INVENTION

Figure 1A:
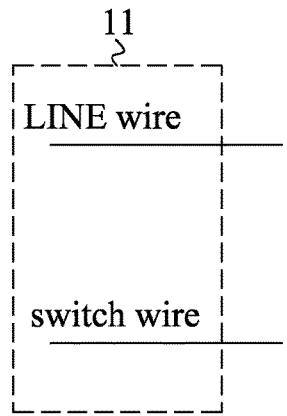
FIG. 1A schematically shows a switch box.
Figure 1B:
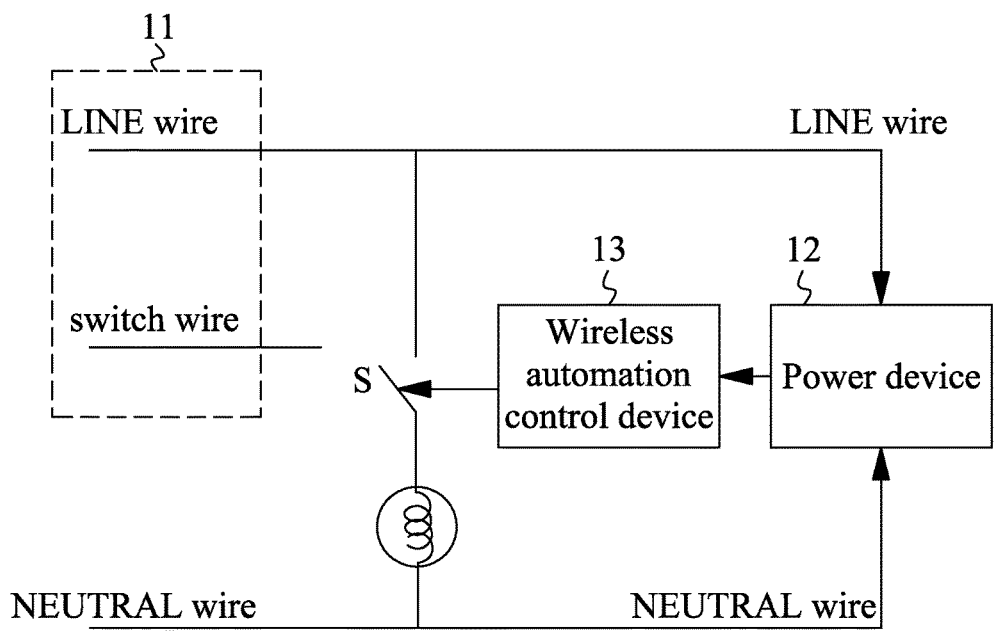
FIG. 1B shows a block diagram illustrated of a conventional wireless automation control system.
Figure 2:
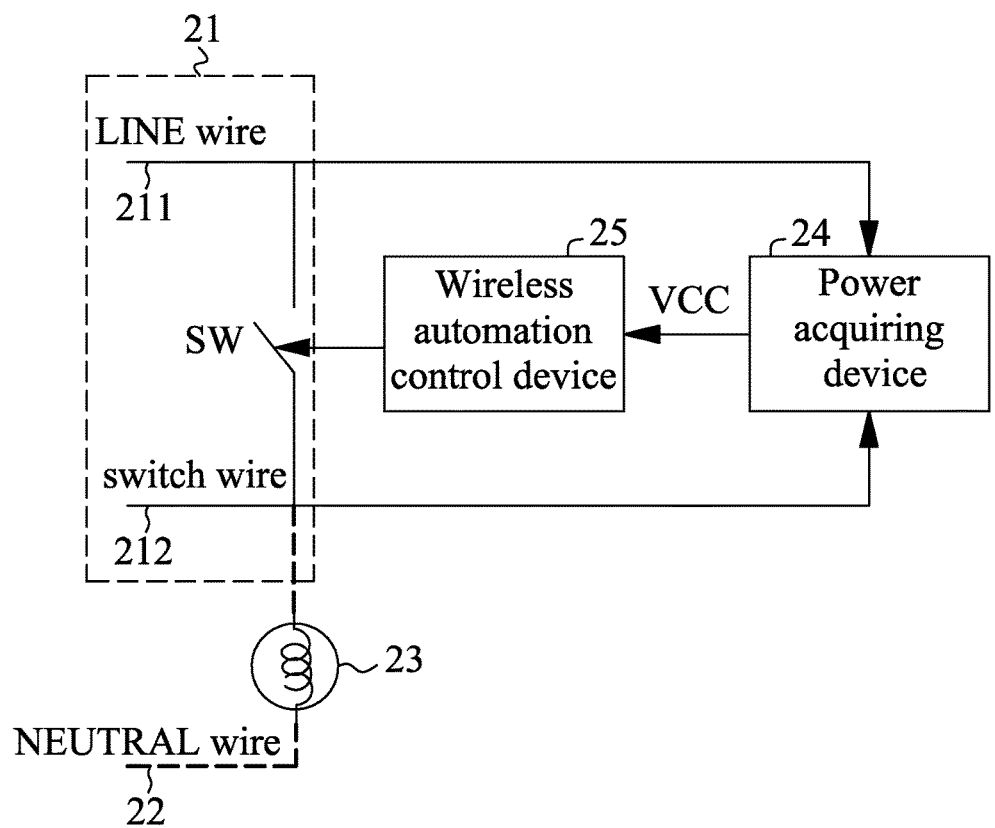
FIG. 2 shows a block diagram illustrated of a control system for a wireless power switch without a NEUTRAL wire according to one embodiment of the present invention.

FIG. 2 shows a block diagram illustrated of a control system for a wireless controlled power switch without a NEUTRAL wire (hereinafter control system) 200 according to one embodiment of the present invention. In the embodiment, a switch box 21 comprises a LINE wire 211 and a switch wire 212 (e.g., a lamp switch wire), without the NEUTRAL wire 22. A wireless controlled power switch (hereinafter switch) SW is connected between the LINE wire 211 and the switch wire 212, and is controlled according to wireless control signal, such that the open and close status of the switch SW may be controlled wirelessly. Although a single-pole single-throw (SPST) switch is shown, it is appreciated that other switch may be used instead. A load device 23 (e.g., a lamp) is connected between the switch wire 212 and the NEUTRAL wire 22 (external to the switch box 21).

The control system 200 of the embodiment may comprise a power acquiring device 24 having two power input terminals connected to the LINE wire 211 and the switch wire 212, respectively, i.e. the power input terminals of the power acquiring device 24 is connected with the switch SW in parallel. The power output ports of the power acquiring device 24 provide an output voltage VCC. The control system 200 of the embodiment may also comprise a wireless automation control device 25, which controls the open and close status of the switch SW according to wireless control signal wirelessly. The wireless automation control device 25 takes the power with output voltage VCC as the required power.

According to one aspect of the embodiment, the switch wire 212 is separated from the NEUTRAL wire 22 by the load device 23. Compared with the conventional system, the power input terminals of the control system 200 (or the power acquiring device 24) of the embodiment are respectively connected to the LINE wire 211 and the switch wire 212, but not connected to the NEUTRAL wire 22.

According to another aspect of the embodiment, the impedance between the input terminals of the power acquiring device 24 is substantially larger than the impedance of the load device 23. For example, an impedance ratio of the power acquiring device 24 to the load device 23 is greater than 10. In one embodiment, an impedance ratio of the power acquiring device 24 to the load device 23 is 10-100. In another embodiment, an impedance ratio of the power acquiring device 24 to the load device 23 is greater than 100.

Operation principle of the embodiment may be demonstrated based on the close status of the switch SW, and on the open status of the switch SW, separately. When the switch SW is closed, the LINE wire 211, the switch SW, the load device 23 and the NEUTRAL wire 22 form a circuit loop with an alternating-current (AC) power (e.g., mains electricity), thereby the load device 23 is activated (e.g., lamp is on). As a voltage between the LINE 211 and the switch wire 212 is zero while the switch is closed, no voltage crosses the power acquiring device 24, such that the power acquiring device 24 does not operate. When the switch SW is open, the LINE wire 211, the power acquiring device 24, the load device 23 and the NEUTRAL wire 22 are forming a circuit loop with the AC power (e.g., mains electricity). Under this circuit topology, the mains electricity voltage, i.e. the voltage between the LINE wire 211 and the NEUTRAL wire 22 is divided to the power acquiring device 24 and the load device 23, and most of the voltage is divided in to the power acquiring device 24 as the impedance of the power acquiring device 24 is substantially larger than the impedance of the load device 23, and power across the load device 23 may be negligible (e.g., lamp is off). Accordingly, the power acquiring device 24 may acquire a current or a voltage when the switch SW is open without effectively activating the load device 23 (e.g., not turning on the lamp).

Figure 3:
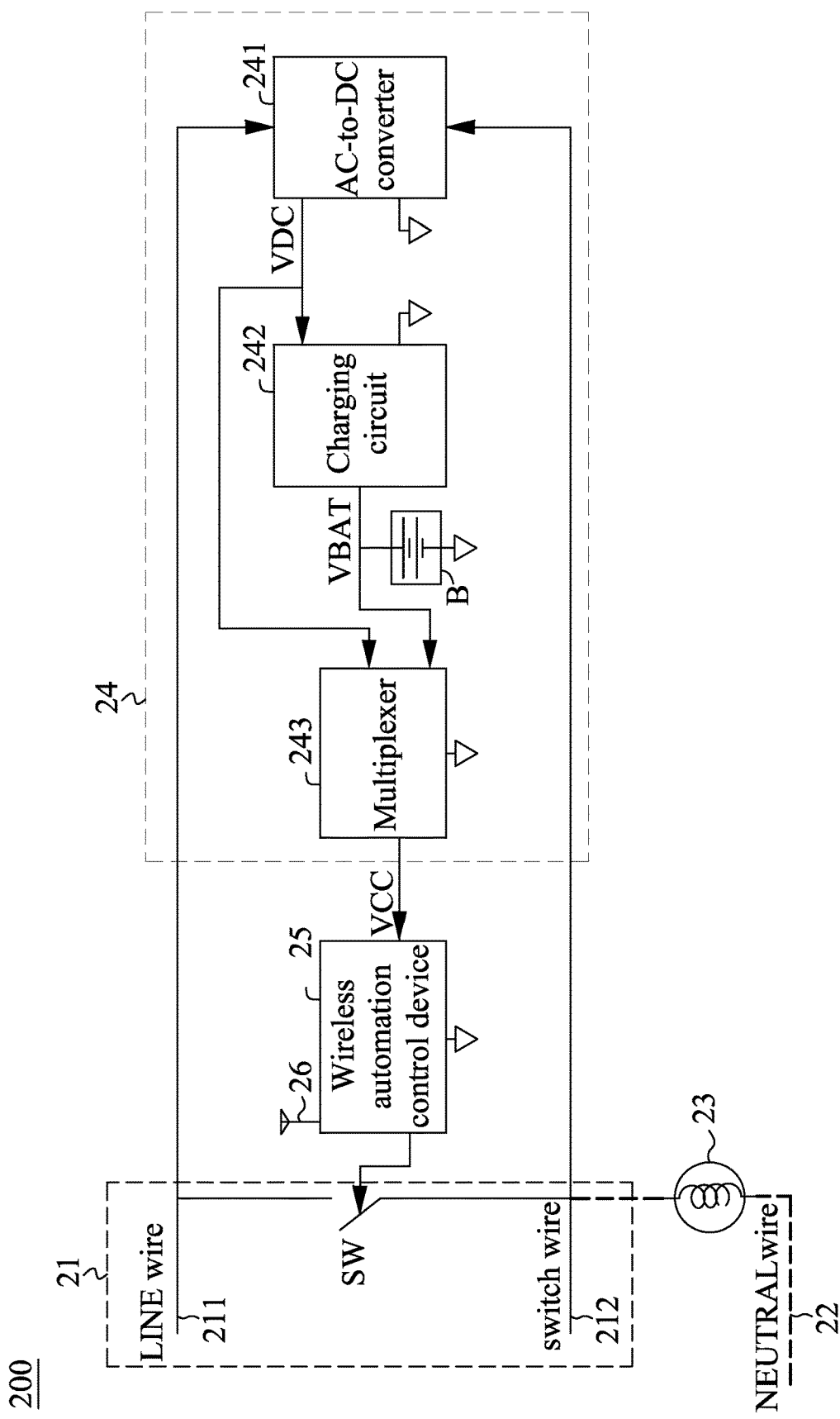
FIG. 3 shows a detailed block diagram of the control system for a wireless power switch without the NEUTRAL wire of FIG. 2.

FIG. 3 shows a detailed block diagram of the control system 200 of FIG. 2. In the embodiment, the power acquiring device 24 may primarily comprise an AC-to-DC converter 241 having two input terminals respectively connected to the LINE wire 211 and the switch wire 212, and an output port generating DC output voltage VDC. In the specification, the AC-to-DC converter 241 refers to a power supply that converts an AC voltage to a DC voltage. The AC-to-DC converter 241 may be implemented using conventional circuit techniques. For example, a transformer is used to convert an AC voltage to another AC voltage with higher or lower value. Subsequently, a rectifier is used to convert the AC voltage out of the transformer to a DC voltage with same (e.g., positive) polarity. Finally, a filter is used to attenuate components of high frequency but to pass components of low frequency.

The power acquiring device 24 of the embodiment may also comprise a charging circuit 242, which receives the DC voltage VDC generated by the AC-to-DC converter 241 as power source to charge a power storage device, e.g. a battery. The output port of the charging circuit 242 is used to charge the rechargeable battery B. In the specification, the charging circuit 242 refers to a circuit that is capable of providing a charging current to the rechargeable battery B. The charging circuit 242 may be implemented using conventional circuit technique.

According to the architecture of FIG. 3, when the switch SW is closed, the LINE wire 211, the switch SW, the load device 23, and the NEUTRAL wire 22 are forming a circuit loop with the AC power (e.g., mains electricity). As the power acquiring device 24 and the switch SW are connected in parallel, the voltage on the input terminals of the power acquiring device 24 is zero while the switch SW is closed, no voltage crosses the power acquiring device 24 and the power acquiring device 24 takes no power. Specifically, as the input terminals of the AC-to-DC converter 241 take no power, the output port of the AC-to-DC converter 241 generates no output power, and the output port of the charging circuit 242 generates no output power, too. The rechargeable battery B is not charged at this time, but power stored previously in the rechargeable battery B may provide battery power with voltage VBAT to the wireless automation control device 25. When the switch SW is open, the LINE wire 211, the power acquiring device 24, the load device 23, and the NEUTRAL wire 22 are forming a circuit loop with the AC power (e.g., mains electricity). As stated above, a voltage provided by the LINE wire 211 and the NEUTRAL wire 22 is divided substantially to the power acquiring device 24, and the voltage and power divided to the load device 23 is negligibly small that the load device is effectively not activated (e.g., lamp is off).

Accordingly, the input terminals of the AC-to-DC converter 241 take a voltage power provided by the LINE wire 211 and the switch wire 212 as required power source (which has a voltage value close to the voltage of the mains electricity, i.e. the voltage between the LINE wire 211 and the NEUTRAL wire 22). The DC output voltage VDC of the AC-to-DC converter 241 provides power for the charging circuit 242 and charges the rechargeable battery B.

The power acquiring device 24 of the embodiment may further comprise a multiplexer 243 having two input ports that connected to the DC voltage output VDC of the AC-to-DC converter 241 and the battery power VBAT provided by the rechargeable battery B, respectively. The multiplexer 243 is capable of selecting one of the input ports between the DC voltage output VDC of the AC-to-DC converter 241 and the battery power VBAT as power source of the wireless automation control device 25, and of bridging the selected power source with the input port of the wireless automation control device 25. The voltage VCC of the output port of the multiplexer 243 is then either one of the voltage of the input port of the multiplexer 243, i.e. VDC of the AC-to-DC converter 241 or VBAT of the rechargeable battery B. Specifically, when the switch SW is open, the power output VCC is the DC voltage output VDC of the AC-to-DC converter 241, and when the switch SW is closed, the power output VCC is VBAT provided by the rechargeable battery B. In this way, the wireless automation control device 25 could always be powered by VCC no matter the switch SW is closed or open.

The wireless automation control device 25 of the embodiment takes the power output VCC (out of the multiplexer 243) as the required power source. The wireless automation control device 25 may control open or close of the switch SW according to wireless control signal received by an antenna 26. In one embodiment, the switch SW and at least a part of the wireless automation control device 25 may be implemented, for example, by a relay. In another embodiment, the wireless automation control device 25 may transmit signals via the antenna 26.

For the foregoing, as no NEUTRAL wire 22 can be acquired within the switch box 21, the embodiment thus proposes the control system for a wireless power switch without the NEUTRAL wire 200, which may provide the DC voltage output VDC as the required power for the wireless automation control device 25 and charge the rechargeable battery B when the switch SW is open; and the rechargeable battery B may provide the stored battery power VBAT as the required power for the wireless automation control device 25 when the switch SW is closed. Accordingly, the control system 200 can obtain the required power in order to control open or close of the switch SW wirelessly despite the lack of the NEUTRAL wire 22.

Although specific embodiments have been illustrated and described, it will be appreciated by those skilled in the art that various modifications may be made without departing from the scope of the present invention, which is intended to be limited solely by the appended claims.

What is claimed is:

1. A control system for a wireless power switch, the system comprising:
   a wireless controlled power switch with both terminals connected between a LINE wire and a switch wire of a switch box but not connected to a NEUTRAL wire;
   a power acquiring device having two power input terminals respectively connected to the LINE wire and the switch wire of the switch box, a power output port of the power acquiring device providing an output voltage; and
   a wireless automation control device receiving the output voltage of the power acquiring device as required power, the wireless automation control device controlling open or close of the wireless controlled power switch according to wireless control signal wirelessly;
   wherein a load device comprising a lamp is connected between the switch wire and the NEUTRAL wire, and impedance between the two power input terminals of the power acquiring device is substantially larger than impedance of the load device;
   when the wireless controlled power switch is open, a voltage provided by the LINE wire and the NEUTRAL wire crosses the power acquiring device and the load device that are connected in series;
   wherein the power acquiring device performs charging to store power in a rechargeable battery when the lamp is off while the wireless controlled power switch is open, and the power acquiring device provides the stored power of the rechargeable battery to the wireless automation control device when the lamp is on while the wireless controlled power switch is closed.

2. The system of claim 1, wherein no voltage crosses the power acquiring device when the wireless controlled power switch is closed.

3. The system of claim 1, wherein the wireless controlled power switch comprises a single-pole single-throw switch.

4. The system of claim 1, wherein an impedance ratio of the impedance between the two power input terminals of the power acquiring device to the impedance of the load device is greater than 10.

5. The system of claim 1, wherein an impedance ratio of the impedance between the two power input terminals of the power acquiring device to the impedance of the load device is 10-100.

6. The system of claim 1, wherein an impedance ratio of the impedance between the two power input terminals of the power acquiring device to the impedance of the load device is greater than 100.

7. The system of claim 1, wherein the power acquiring device comprises:
   an AC-to-DC converter having two input terminals respectively connected to the LINE wire and the switch wire, and an output port generating a DC voltage output;
   a charging circuit receiving the DC voltage output generated by the AC-to-DC converter; and
   the rechargeable battery being charged by output of the charging circuit.

8. The system of claim 7, wherein the output port of the AC-to-DC converter generates no output power and an output port of the charging circuit generates no output power when the wireless controlled power switch is closed; and the output port of the AC-to-DC converter generates the DC voltage output to the charging circuit and the output of the charging circuit charges the rechargeable battery when the wireless controlled power switch is open.

9. The system of claim 7, wherein the power acquiring device further comprises:
   a multiplexer having two input ports respectively receiving the DC voltage output of the AC-to-DC converter and battery power provided by the rechargeable battery, either one of which being selected as the required power.

10. The system of claim 9, wherein the multiplexer selects the DC voltage output of the AC-to-DC converter when the wireless controlled power switch is open; and the multiplexer selects the battery power provided by the rechargeable battery when the wireless controlled power switch is closed.

11. The system of claim 1, wherein the wireless controlled power switch and at least a part of the wireless automation control device comprise a relay.

* * * * *